April 28, 1942.　　　　E. H. BERNO　　　　2,280,784
BRAKE
Filed March 9, 1939　　　　2 Sheets-Sheet 1
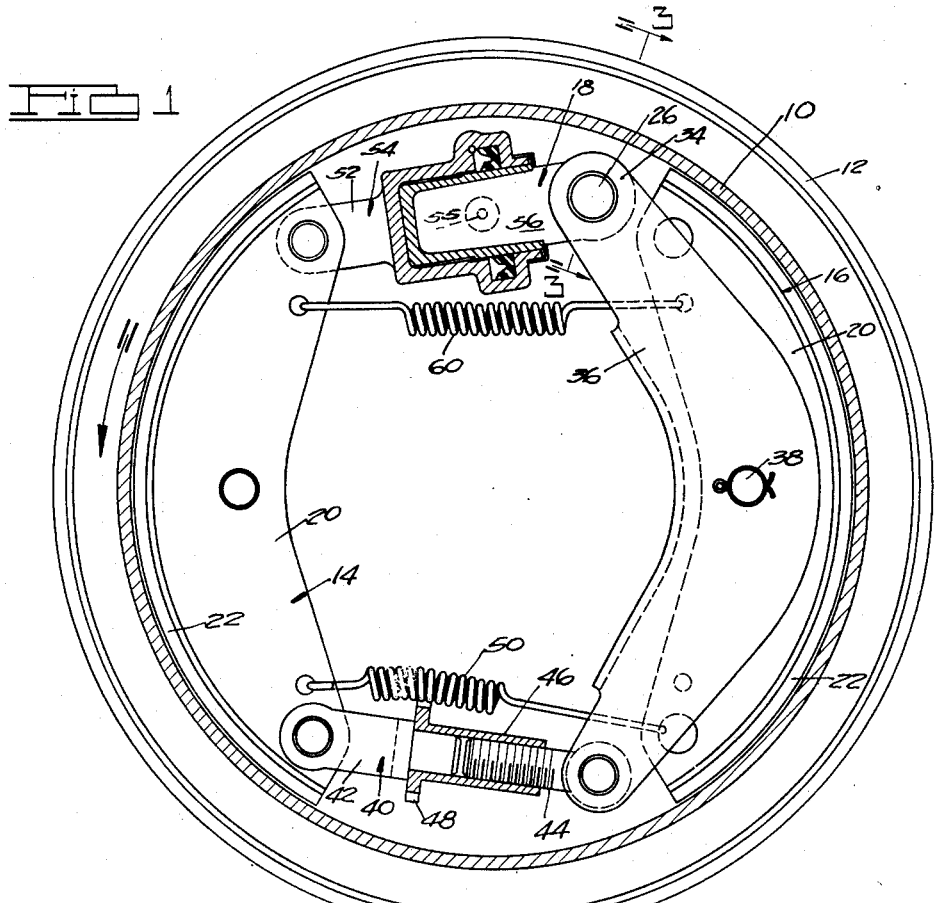
INVENTOR
Edward H. Berno

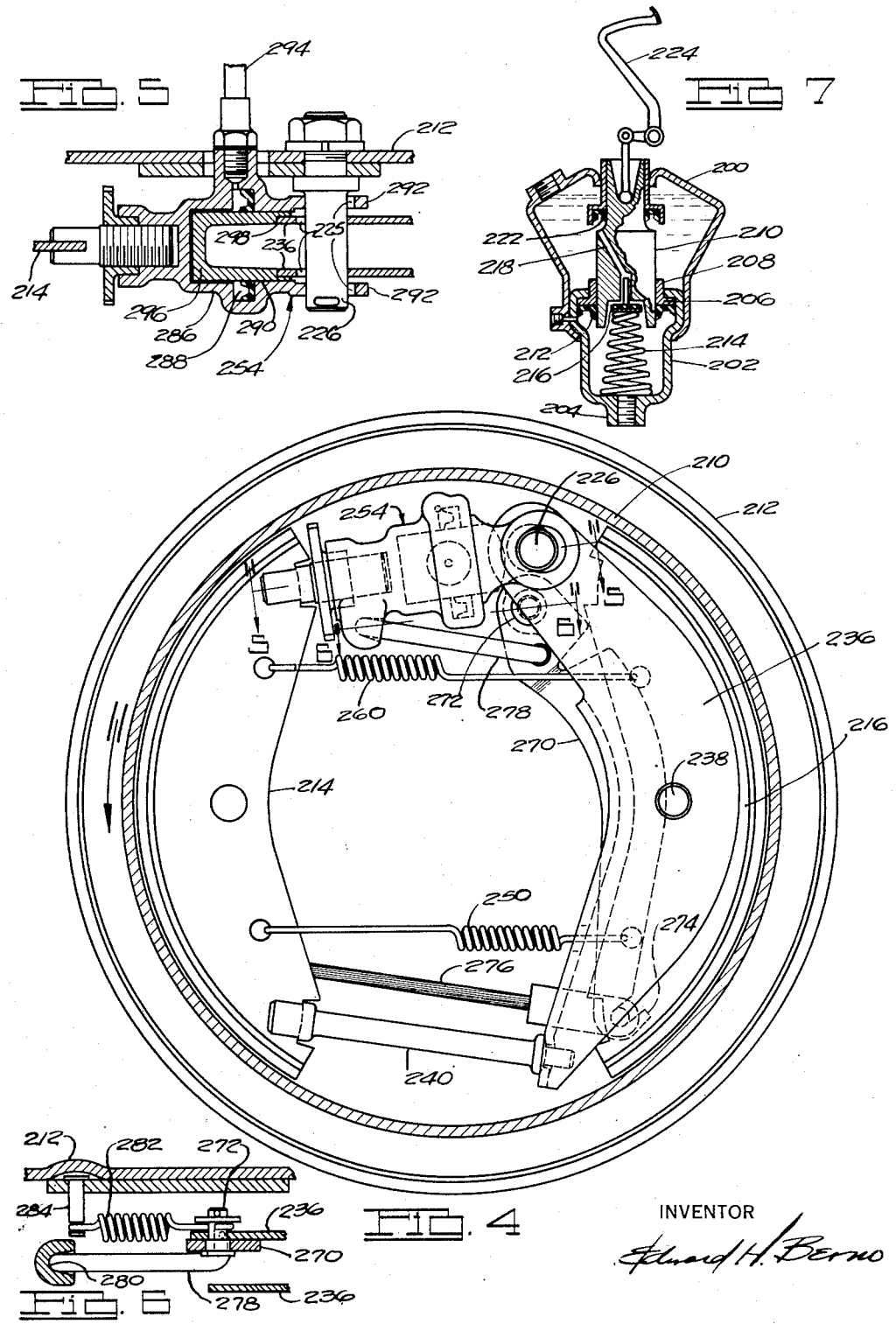

Patented Apr. 28, 1942

2,280,784

UNITED STATES PATENT OFFICE 2,280,784

BRAKE

Edward H. Berno, Plymouth, Mich.

Application March 9, 1939, Serial No. 360,795

12 Claims. (Cl. 188—78)

This invention relates to brakes and has particular reference to braking mechanism particularly adapted for use in wheel brakes of automotive vehicles. The principal object of the invention is to provide a new and improved form of brake mechanism which is simpler in construction, more efficient in operation and more dependable in operation and which is relatively simple to install and to service.

Another object of the invention is to provide a new and improved form of brake mechanism in which the brake shoes and actuating mechanism therefor are floating so that said shoes are free to seek their proper actuating position.

Another object of the invention is to provide a brake mechanism which can be adjusted without requiring the jacking up of the vehicle wheels.

As illustrated in the embodiment of the invention selected for purposes of illustration, the new and improved form of mechanism is shown in connection with a conventional form of brake drum and backing plate and comprises an anchor pin carried by the backing plate, a pair of links pivotally connected to said anchor pin, a shoe the center of which is pivotally supported by the center of one of said links, and another shoe, the ends of which are connected to the ends of said links, one of said links being extensible for moving said shoes into operative relationship with the brake drum.

For better understanding of the invention reference may be had to the following specification taken in conjunction with the accompanying drawings of which there are two sheets and wherein:

Fig. 1 is an elevational view of a wheel brake mechanism embodying my invention, certain of the parts being broken away or illustrated in section for clearness.

Fig. 2 is a partial view of a wheel brake mechanism embodying my invention and illustrating a modified form of adjustment therefor;

Fig. 3 is a sectional view of the mechanism illustrated in Figs. 1 and 2 and taken in a plane along the line 3—3 of Fig. 1 looking in the direction of the arrows;

Fig. 4 is an elevational view of a wheel brake mechanism embodying a modified form of my invention;

Fig. 5 is a section taken along the line 5—5 of Fig. 4;

Fig. 6 is a section taken along the line 6—6 of Fig. 4, and Fig. 7 is a sectional view of a master cylinder construction.

Referring now to Figs. 1 and 3 there is illustrated a wheel brake assembly of a vehicle and which consists as shown of a conventional brake drum 10 which is rotatable with the road wheel of the vehicle, a backing plate 12 which is stationarily supported or carried by the vehicle chassis, a pair of brake shoes 14 and 16 and a means 18 for effecting the application of the brakes and which consists as illustrated of a hydraulic cylinder and piston adapted to be actuated by a master cylinder such as that illustrated in Fig. 7.

Each of the shoes 14 and 16 may as illustrated be of identical construction and consists of a rigid shoe member 20 provided on the face thereof with brake lining material 22 suitably secured thereto. The brake operating mechanism which includes the brake shoes, supports and the cylinder and piston are disposed within the space enclosed by the drum 10 and the backing plate 12.

As illustrated in Fig. 3, the backing plate may have secured thereto such as by welding a reinforcing member 24, through which and the backing plate an aperture is provided so as to form a seat for an anchor pin 26. The anchor pin is provided with an annular flange 28 which seats against the reinforcing member 24 around the opening therein, and that portion of the anchor pin 26 which projects beyond the backing plate 12 may be threaded for receiving a lock washer 30 and a nut 32 so as to hold the anchor pin rigidly in position.

The bifurcated end 34 of a link 36 is pivotally secured upon the anchor pin and this link 36 has a pivotal connection at the center thereof and by means of a pin 38 with the center of one of the brake shoes 16. The free end of link 36 is connected by an adjustable link 40 to one end of the shoe 14. The adjustable link 40 may consist of a part 42 pivoted to one end of the brake shoe 14, a threaded part 44 pivoted to the free end of the link 36 and a sleeve 46 internally threaded at one end thereof for cooperation with the threaded end of the part 44 and formed internally at the other end thereof to provide a seat for the end of the part 42. Rotation of the sleeve 46 by means of the toothed part 48 thereof serves to lengthen or shorten the link 42 depending upon the direction of rotation so as to adjust the distance between the free end of the link or lever 36 and the opposite end of the brake shoe 14. A retracting spring 50 connected at one end thereof to one end of the shoe 14 and at the other end thereof to one end of the shoe 16 serves normally to hold the brake shoes out of engagement with the brake drum as well as to prevent accidental rotation of the sleeve 46.

The brake applying means 18 which as illustrated consists of a cylinder and piston arrangement comprise a link, one end 51 of which is pivotally secured to the anchor pin 26 between the bifurcations of the lever 36 and the other end of which link is pivotally secured to the adjacent end of the brake shoe 14. One part 52 of the link 54 and which is pivoted to one end of the brake shoe 14 is formed to provide a cylinder and the other part 56 of the link 54 is formed to provide a piston within the cylinder and between which piston and cylinder fluid may be introduced under pressure at 55 in any conventional or desirable way for the purpose of forcing the piston and cylinder apart thereby to effect the application of the brakes. As the piston 56 is pivoted to the anchor pin 26 and as the cylinder is pivoted to one end of the brake shoe 14 no other support for the brake applying means 18 is necessary or desirable. The brake applying means 18 which forms a part of the brake linkage (link 54, shoe 14, link 40 and lever 36) and the brake shoes, all are supported from the anchor pin 26. A spring 60 anchored at one end thereof to the top end of the shoe 14 and at the other end thereof to the upper end of the shoe 16 preferably is provided for assisting in holding the brake shoes out of frictional engagement with the drum 10 except when fluid is supplied to the wheel brake cylinder for effecting the application of the brakes.

In the modification illustrated in Fig. 2 the adjustable feature of the link 40 has been incorporated in the link of which the brake applying means forms a part so that the link between the free end of the lever 36 and the free end of the shoe 14 may be of fixed length or non-adjustable. In Fig. 2 the link 154, a part of which comprises the piston and cylinder arrangement illustrated in Fig. 1, has a bore provided within the shank of the part 152 which forms the cylinder and in which bore a threaded pin 153 is received. One end of the pin 153 seats against one end of the brake shoe 114 and the other end of the pin carries a threaded wheel 148 which seats against a shoulder formed on the shank 152 so that by rotation of the wheel the distance between one end of the brake shoe and the fixed anchor pin 126 may be varied if desired so as to properly position the brake shoes in their retracted position with respect to the brake drum. The construction of Fig. 2 otherwise may be identical to that illustrated in Fig. 1.

In assuming that forward movement of the vehicle imparts rotation to the drum 10 in the direction indicated by the arrow, actuation of the brake applying means 18 initially will move the adjacent end of the brake shoe into engagement with the surface of the drum. Further actuation of the brake applying means will tend to cause the shoe 14 to swing in a counter-clockwise direction about its pivotal connection with the link 40; will tend to cause the link 40 to swing in a counter-clockwise direction about its pivotal connection with the end of the lever 36, and will tend to cause the lever 36 to swing in a counter-clockwise direction about the pivot point of the anchor pin 26, thereby moving the friction surface of the shoe 16 into operative engagement with the drum. As illustrated, the brake shoe 16 is non-self-energizing due to the fact that the center of the anchor pin 26 is radially spaced farther from the center of the drum 10 than the pivotal connection 38 between the lever 36 and the brake shoe 16. However, the shoe 16 may be made a self-energizing shoe if the pivotal connection 38 is located farther from the center of rotation of the drum 10 than the anchor pin 26. The shoe 14 as illustrated is self-energizing and does have a servo effect upon the shoe 16 due to the fact that the shoe 14 tends to rotate with the drum 10 upon operative engagement therewith.

In the modification illustrated in Figs. 4, 5 and 6 the construction illustrated in Figs. 1 and 2 is incorporated except that in Figs. 4, 5 and 6 the linkages are so arranged that the same braking action may be obtained regardless of the direction in which the brake drum is turning. In other words, forward and reverse braking will be the same. In Fig. 4 a backing plate 212 carries an anchor pin 226. A series of links 236, 240, 214 and 254, having pivotal connections between the ends thereof as illustrated, are connected to and supported by the anchor pin 226, the ends of the links 254 and 236 connected to the anchor pin 226 being provided with slots 225 through which the pin 226 projects so that the links 254 and 236 may be said to have a pivotal sliding connection with the anchor pin 226. The link 214 consists of a brake shoe provided with lining for cooperating with the cylindrical braking surface of the drum 210, while the link 236 is pivotally connected at its center by a pin 238 to the center of a brake shoe 216. Springs 250 and 260 connected at the ends thereof to the shoes 214 and 216 serve to hold the shoes in a retracted position. The construction of the drum 210, the backing plate 212, the shoes 214 and 216, the lever 236, the springs 250 and 260 and the piston and cylinder comprising the link 254 may be identical to that of the corresponding parts illustrated in Figs. 1, 2 and 3. While the link 240 is not adjustable, it performs the same function as the link 40 in Fig. 1 and is pivotally connected to one end of the shoe 214 and one end of the lever 236.

For mechanical actuation of the brake shoes, such as by means of a parking brake lever, the following mechanism may be provided in conjunction with the hydraulic mechanism. A lever 270 pivoted at 272 to a part of the link 236 may have connected to the free end 274 thereof a cable 276 which when tensioned will tend to move lever 270 in a clockwise direction about its pivot 272. The cable 276 may be connected in any way known to the art to a manual or other brake applying means. A link 278 of fixed length has one end thereof seated in a socket 280 and the other end of such link 278 is pivotally connected to the lever 270, a spring 282 being arranged between a pin 284 carried by the backing plate 212 and pivotal connection 272 for holding the link 278 in the socket 280. Movement of the lever 270 in a clockwise direction locking at Fig. 4 will effect an application of the brakes in exactly the same manner as operation of the hydraulic means 254. The hydraulic means which comprise the link 254 may consist of a casting formed to provide internally thereof a cylinder 286, an annular recess 288, a cylindrical bearing surface 290 and bifurcations 292 having the slots 225 as previously pointed out. Fluid under pressure may be supplied to the cylinder 286 through the annular recess 288 by means of a hose and fitting 294, suitably connected at the casting which forms the brake cylinder 286. Within the recess 288 an annular flexible gasket of rubber or other suitable material and having a U shaped cross section is arranged for sealing the piston 296 to the walls of the recess 288 to prevent loss of fluid from the cylinder 286. The piston 296, it will be observed, is of slightly smaller diameter than the inside diameter of the cylinder 286 so as to permit flow of fluid through the recess 288 and around the end of the piston 296 so as to move the piston outwardly of the cylinder. The piston 296 is supported for sliding movement by the bearing surface 290 and the end of the piston 296 is formed to provide a seat 298 for the bifurcated end of the lever 236 so that upon movement of the piston out of the cylinder the cylinder reacts against the brake shoe 214 while the piston reacts against the lever 236 and the brake shoe 216. In this manner the same braking action is obtained whether the vehicle moves forwardly or rearwardly, the only difference being that when the vehicle is moving forwardly according to the direction indicated by the arrow in Fig. 4 the brake shoe assembly consisting of the links 214, 254, 236, 216 and 240 will rotate until the anchor pin 226 seats against the right hand end of the slots 225 in the bifurcated end of the lever 236, whereas upon reverse braking the assembly will rotate in the opposite direction until the pin 226 seats against the left hand end of the slots 225 in the end 292 of the cylinder (Fig. 5). The slots 225 are of such length as to permit the brake shoes to cooperate with the brake drum and to take care of the wear during the life of the brake lining.

In Fig. 7 there is illustrated a master cylinder construction which embodies the same type of cylinder and piston construction as is utilized in the wheel brake cylinders. As shown in Fig. 7, a casing 200 closed at the top thereof in any suitable way has integrally assembled thereto a cup shaped cylinder 202 having a fitting 204 adapted for connection to the fluid line of a hydraulic brake system, a circular plate 206 suitably secured to the forward wall of the casing 200 and generally in alignment with the cylinder 202 has a flange 208 formed to provide a bearing for a piston 210. The diameter of the cylinder 202 is greater than the external diameter of the piston 210. An annular flexible gasket 212 of U shaped cross section is seated upon the plate 208 and arranged between the walls of the cylinder 202 and the outside wall of the piston 210 for sealing about the piston. A spring 214 may be arranged between one wall of the cylinder 202 and a valve member 216 which controls a passage 218 by means of which fluid may pass from the reservoir provided by the casing 200 into the cylinder 202 when the cylinder is retracted or during the retractile movement thereof. Upon the initial movement of the piston 210 to apply the brakes the valve member 216 will seat, thereby preventing a flow of fluid in each direction through the passage 218. The end of the piston 210 may be supported by a bearing formed on the wall of the casing 200 and sealed by a gasket 222 of a construction similar to the construction 212. A conventional brake pedal 224 may be suitably connected to the end of the piston 210 for actuating the same.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. Brake mechanism comprising a brake drum, a backing plate, an anchor pin carried thereby, a pair of links each of which is pivotally secured to said anchor pin in such a manner so as to have a limited sliding movement relative thereto, a brake shoe, one end of which is pivotally connected to one end of one of said links, a connection between the other end of said shoe and the free end of the other of said links and a shoe carried by said other of said links, one of said links being extensible for moving said shoes into braking engagement with said drum.

2. Brake mechanism comprising a drum, a supporting plate, an anchor pin carried by said supporting plate, a pair of links, one end of each of said links being pivotally connected to said anchor pin so as to have a limited sliding movement relative thereto, a brake shoe, one end of which is operatively connected to one end of one of said links, a connection between the one end of said shoe and the other end of the other of said links, a second brake shoe, a pivotal connection between the center of said second brake shoe and said other of said links, one of said links being adjustable for moving said shoes into operative engagement with said brake drum.

3. Wheel brake structure comprising a brake drum, a supporting plate having an anchor pin, a pair of links, one end of each of said links being pivotally connected to said anchor pin in such a way as to have a limited sliding movement relative thereto, an articulated connection between the free end of each of said links and having brake means operatively associated therewith and other brake means operatively associated with one of said links so as to be actuated thereby, one of said links comprising a means for moving said brake means into operative engagement with said brake drum.

4. Wheel brake structure comprising a brake drum, a supporting plate having an anchor pin, a plurality of links connected together, one of which includes a brake shoe, one of which is pivotally connected at its center to a second brake shoe and another of which links is extensible for moving said shoes into operative engagement with said brake drum, said extensible link being arranged between said pin and one of the other of said links, at least one of said links having a slot into which said pin extends for taking the torque of the brake shoes.

5. Wheel brake mechanism comprising a brake drum, a backing plate, an anchor pin carried by said backing plate, a series of links pivotally connected together, the adjacent ends of the two end links being arranged in overlapping relationship and provided with aligned slots into which said anchor pin extends, one of said links comprising a brake shoe and another of said links having a brake shoe pivotally connected thereto and means for expanding said links for moving said shoes into operative engagement with said drum.

6. Wheel brake structure comprising a brake drum, a backing plate having only a single anchor pin, a lever having a slot at one end thereof into which said anchor pin extends, a brake shoe, a pivotal connection between the center of said brake shoe and said lever, a second brake shoe, connections between the ends of said second brake shoe and the ends of said lever, one of said connections being connected to said anchor pin in such a way as to have a limited sliding movement relative thereto and comprising a means for moving said shoes into operative engagement with said drum, said pin forming the sole means for taking the torque of the brake shoes in both directions of rotation of the wheel.

7. Wheel brake structure comprising a brake drum, a backing plate having an anchor carried thereby, a pair of links, one end of each of which is pivotally connected to said anchor in such a way as to have a limited sliding movement relative thereto, one of said links comprising a piston and cylinder and the other end of which is connected to a brake shoe, a second brake shoe pivotally carried by the other of said links and a connection between the free end of said other of said links and one end of said first mentioned brake shoe.

8. Wheel brake structure comprising a backing plate having an anchor pin, a pair of links, each of said links having a slot at one end thereof through which said anchor pin extends, a brake shoe, the ends of which are connected to the other ends of said links, a second brake shoe having a pivotal connection with one of said links, a brake drum cooperable with said shoes, one of said links being extensible for moving said shoes into operative engagement with said drum.

9. Wheel brake structure comprising a plate, a pair of links, one end of each of said links being connected to said plate by means of a pin and slot connection, a brake shoe having its ends operatively connected to the other ends of said links, a drum cooperable with said shoe, one of said links being extensible for moving said shoe into operative engagement with said drum.

10. Wheel brake structure comprising a plurality of links connected in series, the free ends of the two end links being provided with a slot, supporting means including an anchor pin extending through said slots, one of said links comprising a brake shoe, another of said links having a brake shoe pivotally connected thereto and another of said links being extensible for operating said shoes.

11. Wheel brake structure comprising a backing plate having an anchor pin, a brake drum, a plurality of links connected in series, one of which consists solely of a brake shoe and another of which has a second brake shoe pivotally carried thereby, one of said links being extensible for moving said shoes into cooperative engagement with said drum, said extensible link being provided with a seat which is engageable with said anchor pin for taking the torque of the brake shoes in one direction of rotation of said drum and one of the other links being provided with a seat which is engageable with said anchor pin for taking the torque of the brake shoes in the opposite direction of rotation of said drum.

12. Wheel brake structure comprising a plate, a pair of links, one end of each of said links being connected to said plate by means of a pin and slot connection, a brake shoe operatively associated with the other ends of said links so as to be actuated thereby, a drum cooperable with said shoe, one of said links being extensible and having operating means associated therewith for extending the same so as to move said shoe into operative engagement with said drum.

EDWARD H. BERNO.